United States Patent [19]

Mercil

[11] 4,427,154
[45] Jan. 24, 1984

[54] BOOM SUSPENSION AND LIFT ASSEMBLY

[76] Inventor: LeRoy J. Mercil, Box 55, Brooks, Minn. 56715

[21] Appl. No.: 378,897

[22] Filed: May 17, 1982

[51] Int. Cl.³ ............................ B05B 3/02; B05B 3/12
[52] U.S. Cl. .................................... 239/161; 239/167
[58] Field of Search ............... 239/160, 161, 164, 165, 239/166, 167, 168

[56] References Cited

U.S. PATENT DOCUMENTS

| | | | |
|---|---|---|---|
| 869,958 | 11/1907 | Bateman et al. | 239/167 |
| 2,273,344 | 2/1942 | Black et al. | 239/166 |
| 2,647,794 | 8/1953 | Mueller et al. | 299/30 |
| 2,964,247 | 12/1960 | Maasdam | 239/167 |
| 2,995,307 | 8/1961 | McMahon | 299/161 |
| 3,043,519 | 7/1962 | Tygart | 239/167 |
| 3,223,330 | 12/1965 | La Plante | 239/168 |
| 3,301,487 | 1/1967 | Young | 239/168 |
| 3,329,030 | 7/1967 | Dijkhof | 74/105 |
| 3,357,642 | 12/1967 | Horton | 239/159 |
| 3,395,503 | 8/1968 | Greenburg et al. | 52/114 |
| 3,447,750 | 6/1969 | Weston | 239/167 |
| 3,472,454 | 10/1969 | Blue et al. | 239/77 |
| 3,554,478 | 1/1971 | Sunderman | 248/278 |
| 3,580,505 | 5/1971 | Loeffler | 239/168 |
| 3,581,993 | 6/1971 | Reams | 239/167 |
| 3,731,879 | 5/1973 | Dijkhof | 239/167 |
| 3,904,118 | 9/1975 | Farmery | 239/165 |
| 4,039,147 | 8/1977 | Hugg | 239/167 |
| 4,064,656 | 12/1977 | Zeidler | 239/165 |
| 4,221,353 | 9/1980 | Kuhn et al. | 248/292.1 |
| 4,320,595 | 2/1982 | McClure et al. | 47/1.5 |

FOREIGN PATENT DOCUMENTS 1028380  4/1958  Fed. Rep. of Germany ...... 239/166

OTHER PUBLICATIONS

"Blumhardt Pickup Mounted Sprayer," Brochure by Blumhardt Mfg., Inc. of Ashley, N. Dak.

*Primary Examiner*—John J. Love
*Assistant Examiner*—Jon Rastello
*Attorney, Agent, or Firm*—Kinney, Lange, Braddock, Westman and Fairbairn

[57] ABSTRACT

The present invention relates to a boom suspension and lift assembly which is mounted to extend laterally from a vehicle for agricultural spraying purposes. The boom assembly comprises a main frame mounted on the vehicle and at least one boom pivotally mounted on the main frame. A suspension system between each boom and the main frame independently absorbs boom motion resulting from vehicle travel over uneven terrain. A boom lifting system is provided to selectively lift each boom relative to the main frame by pivoting the boom about a longitudinal axis adjacent the main frame. For transport or storage, each boom is foldable against a side of the vehicle.

25 Claims, 13 Drawing Figures

BOOM SUSPENSION AND LIFT ASSEMBLY

BACKGROUND OF THE INVENTION

1. Field of the Invention

The present invention relates to agricultural spraying apparatus, and specifically to a spray boom suspension and lift assembly.

2. Description of the Prior Art

Liquid chemicals, such as fertilizer and insecticides, are commonly distributed by means of a spray apparatus carried on an applicator vehicle. Such spray apparatus generally has spray booms extending from each side of the applicator vehicle to permit distribution of the liquid chemical in as wide an area as possible for each pass of the applicator vehicle. By increasing the length of each boom, the spraying efficiency of the apparatus (in terms of both time and fuel) is substantially increased.

A number of problems are encountered when such booms are lengthened, however. For instance, it is usually necessary to transport such spray apparatus on public highways and through gates and openings in fences. Therefore, relatively long booms much be foldable against the applicator vehicle so that they do not interfere with the movement of the spray apparatus from one location to another. To this end, numerous boom designs have been developed which address this problem. Spray boom devices in which the booms are pivoted upwardly on horizontal axes to extend substantially vertical for transport are shown in the following United States Patents:

| Inventor | U.S. Pat. No. | Issue Date |
|---|---|---|
| McClure et al | 4,320,595 | 03/23/82 |
| Reams | 3,581,993 | 06/01/71 |
| Loeffler | 3,580,505 | 05/25/71 |
| Blue et al | 3,472,454 | 10/14/69 |
| Young | 3,301,487 | 01/31/67 |
| Tygart | 3,043,519 | 07/10/62 |
| McMahon | 2,995,307 | 08/08/61 |
| Mueller et al | 2,647,794 | 08/04/53 |
| Black et al | 2,273,344 | 02/17/42 |

The lengths of the booms (or boom sections in the case of a foldable boom) are somewhat limited with the devices of these patents. Relatively long booms, when positioned for transport, would extend a substantial distance above the top of the applicator vehicle, thus precluding movement in an area where the vehicle must pass under overhead obstructions, such as low-hanging power lines or a bridge.

Spray boom devices where the booms are swung or folded to the side of the applicator vehicle to extend longitudinally thereon for transport or storage are shown in U.S. Pat. Nos. 4,221,353 granted to Kuhn et al. on Sept. 9, 1980; 4,038,147 granted to Hugg on Aug. 2, 1977; 3,447,750 granted to Weston on June 3, 1969; and 3,329,030 granted to Dijkhof on July 4, 1967. A side folding agricultural spray boom device is also shown in two promotional brochures of Blumhardt Manufacturing, Inc. of Ashley. N. Dak., which are both entitled "Blumhardt Pickup Mounted Sprayer." These devices show various means for folding the booms of such spray devices along substantially vertical axes to lie generally flat against the side of the vehicle. This is the preferred design for a relatively long multi-section boom since the sections of the boom can fold against each other and the vehicle for transport without significantly altering the usual lateral dimensions of the vehicle.

An additional consideration when the booms of a spray apparatus are relatively long is that the booms can, in effect, become powerful lever arms which act upon the applicator vehicle. Jarring motions of the vehicle, such as occur when it encounters a rut or hole in the field, cause the extended booms to bounce up and down. If a boom is of substantial length relative to the vehicle, relatively small vertical motions can result in bouncing of a large magnitude relative to the vehicle. To this end, devices have been developed to absorb the greater part of such bouncing impact from the booms to prevent undue strain on the spray apparatus and applicator vehicle. In U.S. Pat. Nos. 4,221,353 granted to Kuhn et al. on Sept. 9, 1980; 3,357,642 granted to Horton on Dec. 12, 1967; and the device shown in the Blumhardt brochures, the inner ends of the booms of these devices are mounted to pivot during operation, with the pivoting being controlled by spring-loaded rocker arms and shock absorbers operably connecting the booms to their respective central frames. These devices allow the booms to pivot on substantially horizontal axes relative to the applicator vehicle in a controlled state (because of the springs and shock absorbers) and absorb the bouncing or jarring motions of the booms as they react to changes in position of the applicator vehicle caused by uneven terrain.

It is sometimes necessary to tilt a boom relative to the applicator vehicle to allow the boom to clear an obstruction in the path of the boom. In the case of a horizontally folding boom, the boom must be provided with a means for tilting to boom. The device shown in U.S. Pat. No. 4,221,353 granted to Kuhn et al. on Sept. 9, 1980, is provided with manual means to tilt the boom to an upper clearance position. The necessity for manual actuation to raise the boom of this device could prove quite dangerous, since it necessarily requires distraction of the vehicle operator both physically and mentally from the normal motive operations of the applicator vehicle. The boom of this device has inner and outer sections with a resilient support mechanism between the inner section and the vehicle but having no such resilient support between the inner and outer sections. The structural portion of the vehicle upon which the booms are mounted is rigid and thus does not assist in the tilting of the booms.

U.S. Pat. Nos. 3,223,330 granted to La Plante on Dec. 14, 1965 and 869,958 granted to Bateman and Jones on Nov. 5, 1907 show spray boom devices where sliding elements on the main frame from which the booms are mounted results in movement of the booms. In the device shown in Bateman and Jones, the booms merely slide laterally upon the main frame for use, and therefore, are quite limited in their length. In the device of La Plante, a single horizontal slide on the main frame is connected to each of the booms so that movement of the slide transverse to the applicator vehicle causes one boom to be tilted upwardly and the other boom to be tilted downwardly. In these devices, a single sliding mechanisms are linked to both booms so that the booms are not independently movable or tiltable.

U.S. patents showing additional spray boom devices of interest include:

| Inventor | U.S. Pat. No. | Issue Date |
|---|---|---|
| Greenburg | 3,395,503 | 08/06/68 |

| -continued | | |
| --- | --- | --- |
| Inventor | U.S. Pat. No. | Issue Date |
| Dijkhof | 3,731,879 | 05/08/73 |
| Sunderman | 3,554,478 | 02/12/71 |
| Horstine Farmery | 3,904,118 | 09/09/75 |

None of these prior art devices show a boom assembly horizontally folding boom which is independently suspended from a main frame for floating action of the boom on a plurality of longitudinal axes and having a raising mechanism to selectively raise the boom by creating a force through the suspension means caused by pivoting portions of the main frame of the boom assembly. In addition, the boom assembly of the present invention is relatively inexpensive of manufacture, simple to maintain and repair, and sturdy of construction, as well as being easy to use and transport.

SUMMARY OF THE INVENTION

The present invention relates to spray boom suspension and lift assemblies. More particularly, the invention relates to a boom assembly which exhibits an operational versatility not previously achieved in prior art spray boom devices. The boom assembly of the present invention comprises a main frame mountable on a vehicle and having at least one boom extending laterally therefrom. Each boom is basically a pivotally connected four-link structure with one of the links being a generally upright base post mounted on the main frame. Each boom is coupled to the main frame by a suspension means which, when the boom is extended in an operative position, permits the boom to pivot on at least one longitudinal axis relative to the main frame to allow the boom to float in a controlled manner relative to the main frame in response to ground contour changes encountered by the vehicle. Raising means are provided between the main frame and each boom for selectively raising the boom relative to the main frame from a lower operational position to an upper clearance position to clear obstructions in its path of advancement.

The four link structure of each boom includes the base post and a generally upright link and has laterally extending upper and lower members pivotally connected on separate longitudinal axes to the upright link at their ends and pivotally connected on separate vertical axes with respect to the base post at their inner ends. The base post of each boom is pivotally mounted to the main frame on a base post longitudinal axis with the pivotal movement of the base post being controlled by a lever arm pivotally mounted on the main frame.

The suspension means includes a separate suspension frame for each boom pivotally mounted on a frame longitudinal axis adjacent an upper end of each base post, with the inner end of the upper member of the boom being pivotally mounted adjacent a lower end of its respective suspension frame. Separate connector means are coupled between adjacent the upright link of the respective boom and adjacent an upper end of the respective suspension frame. Bias means coupled between each suspension frame and the main frame urge the upper end of each suspension frame inwardly toward the main frame to create a force through the suspension means tending to lift the upright link and acting against the normal weight of the boom acting on the suspension means. The raising means operates through the suspension means and with the pivotal connections of each boom to selectively lift or tilt the boom relative to the main frame.

An outer boom section is pivotally mounted on each boom on a substantially vertical axis, with each boom in turn pivotally mounted on at least one substantially vertical axis to its respective side of the main frame to permit folding of the boom against the sides of the vehicle for transport. The outer boom section is also mounted on the upright link of its respective boom to form a two-section boom which is selectively raisable relative to the main frame and with the sections of the boom mounted relative to each other and the main frame to permit controlled floatation of the boom as the vehicle encounters rough terrain.

DETAILED DESCRIPTION OF THE PREFERRED EMBODIMENTS

Figures 1, 11, 12:
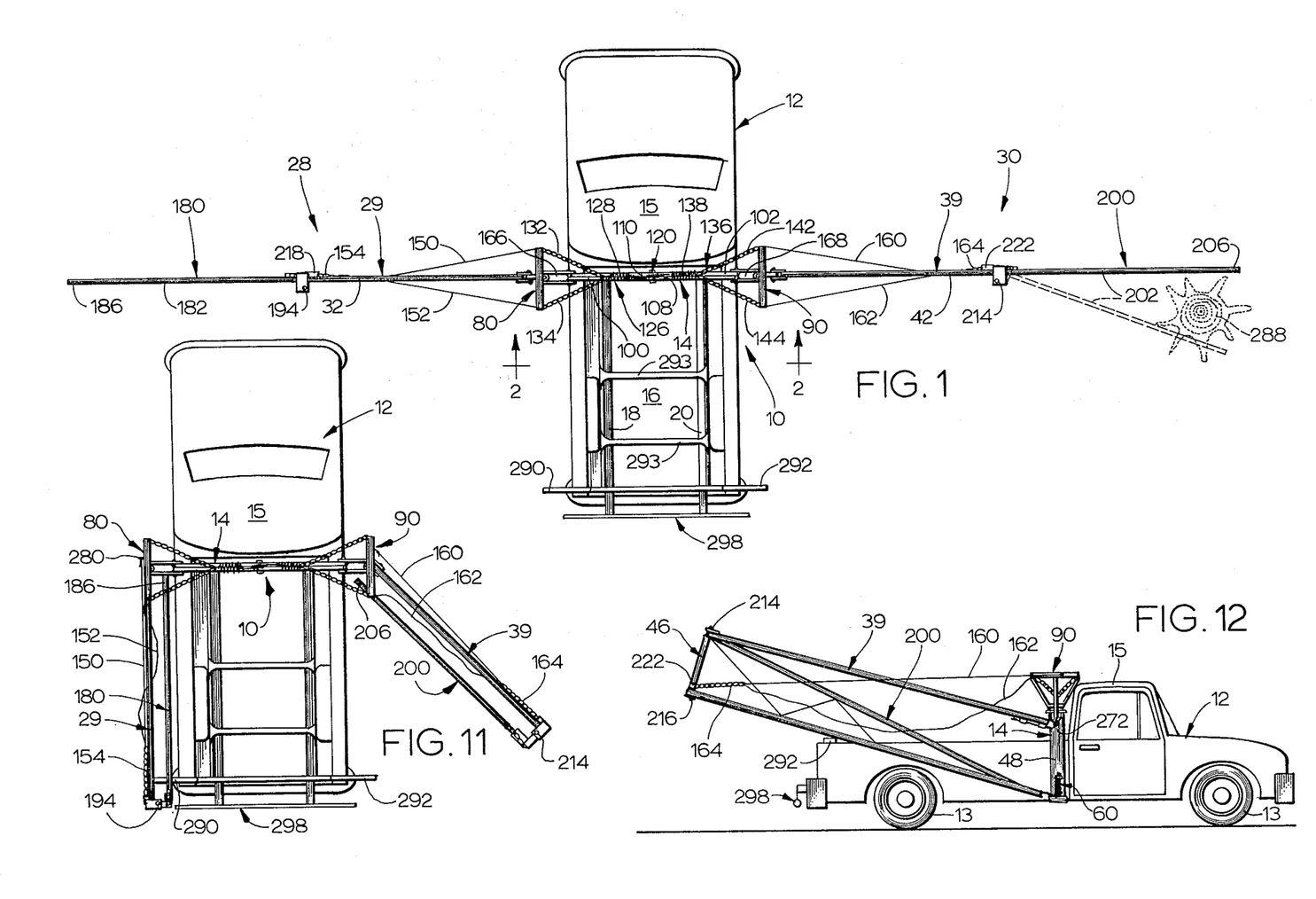
FIG. 1 is a top plan view of the boom lift and suspension assembly of the present invention mounted on a vehicle.
FIG. 11 is a top plan view of the boom assembly of the present invention with the booms partially folded against the sides of the vehicle.
FIG. 12 is a side elevational view of the boom assembly of the present invention showing a boom folded against the side of the vehicle.

FIG. 1 shows a spray boom suspension and lift assembly 10 of the present invention mounted on a mobile applicator vehicle, such as a pickup truck 12 having ground engaging wheels 13. FIGS. 2–5 also show the boom assembly 10 mounted on the pickup truck 12 in various operating positions. To facilitate discussion, the following description is made in terms of portions of the boom assembly 10 being on (or operable on) a left side or a right side of the vehicle, as viewed in FIGS. 1–5.

As shown, the boom assembly 10 has a main frame 14 mounted in a cargo bed 16 generally to the immediate rear of an operator's cab 15 of the pickup truck 12. Left and right bottom supports 18 and 20 of the main frame 14 extend longitudinally in the cargo bed 16. At a forward end of the rear cargo bed 16 (approximately in the longitudinal center of the pickup truck 12), a lateral beam 22 of the main frame 14 extends transversely across the pickup truck 12. The lateral beam 22 is supported above the cargo bed 16 by generally parallel left and right support legs 24 and 26 of the main frame 14, which extend upwardly from the forward ends of the bottom supports 18 and 20 respectively.

At least one spray boom is mounted on the main frame 14 to extend outwardly from a side of pickup truck 12. As shown, a left boom 28 and a right boom 30 are mounted on left and right sides of the main frame 14 respectively to extend laterally from the pickup truck 12. The left boom 28 includes a left inner section 29 which is basically a four-link structure having an upper member 32, a lower member 34, a generally upright link 36, and a left generally upright base post 38. The right boom 30 includes a similar four-link inner section 39, which has an upper member 42, a lower member 44, a generally upright link 46, and a right generally upright base post 48. The four components of each inner section of each boom are pivotally connected relative to one another on longitudinal axes to generally define a four-sided polygon structure, with the left and right base posts 38 and 48 mounted on their respective sides of the main frame 14 adjacent the pickup truck 12.

The left base post 38 is pivotally mounted proximate its midpoint on a base post longitudinal axis by a pivot pin 50 on a left end of the lateral beam 22, and the right base post 48 is pivotally mounted proximate its midpoint on a base post longitudinal axis by a pivot pin 52 on a right end of the lateral beam 22. Thus, each base post has an outer boom side and an opposite inner vehicle side.

Figure 2:
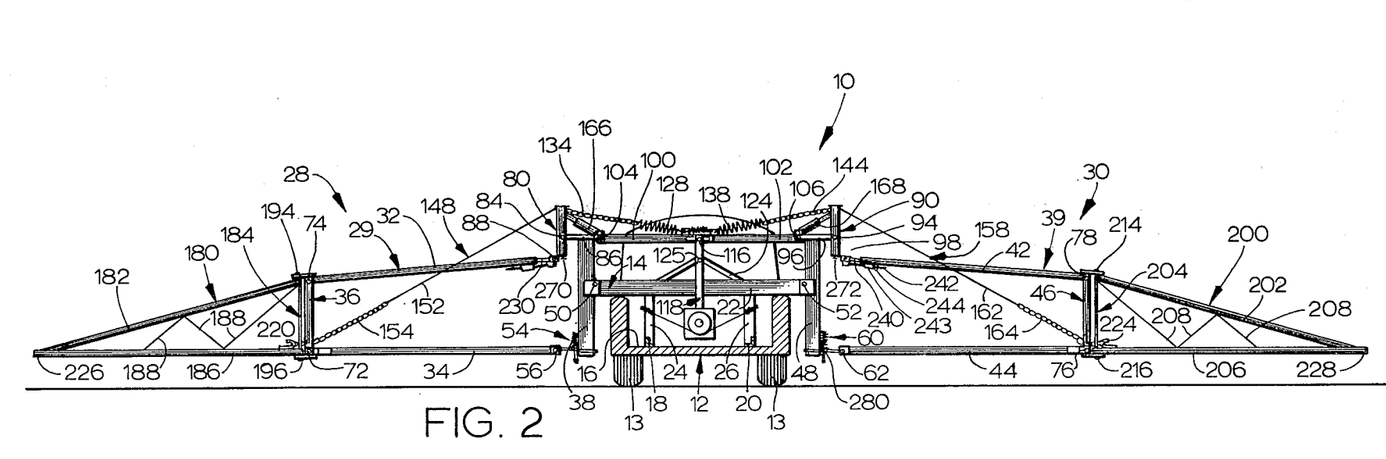
FIG. 2 is a sectional view as taken along line 2—2 in FIG. 1 showing the boom assembly in its normal operating position.
Figure 6:
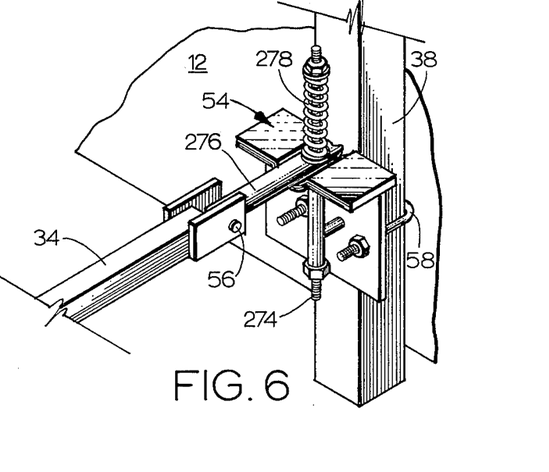
FIG. 6 is an enlarged perspective view of a lower boom mounted for one of the booms with the boom extended in its operating position.

A lower boom mount 54 is slidably mounted upon each base post and provides means for pivotally connecting the lower members of the inner sections of each boom to their respective base posts. As best shown in FIG. 6, a left lower boom mount 54 on the left base post 38 extends outwardly from the boom side of the base post 38 adjacent a bottom end of the base post 38. An inner end of the lower member 34 of the left boom 28 is pivotally mounted to the left lower boom mount 54 on a longitudinal axis by a pivot pin 56, and the left boom mount 54 is secured to the left base post 38 by suitable releasable fastener means 58. The fastener means 58 is loosened for movement and tightened when the lower boom mount 54 has been moved to the desired vertical position on the base post 38. A right lower boom mount 60 is similarly mounted adjacent a bottom end of the right base post 48, with an inner end of the lower member 44 of the right boom 30 pivotally mounted to the right boom mount 60 by a pivot pin 62, as shown in FIG. 2. The respective lower boom mounts 54 and 60 are slidably adjustable on their respective base posts to any desired position below the pivotal connections of said base posts to the lateral beam 22.

Figure 7:
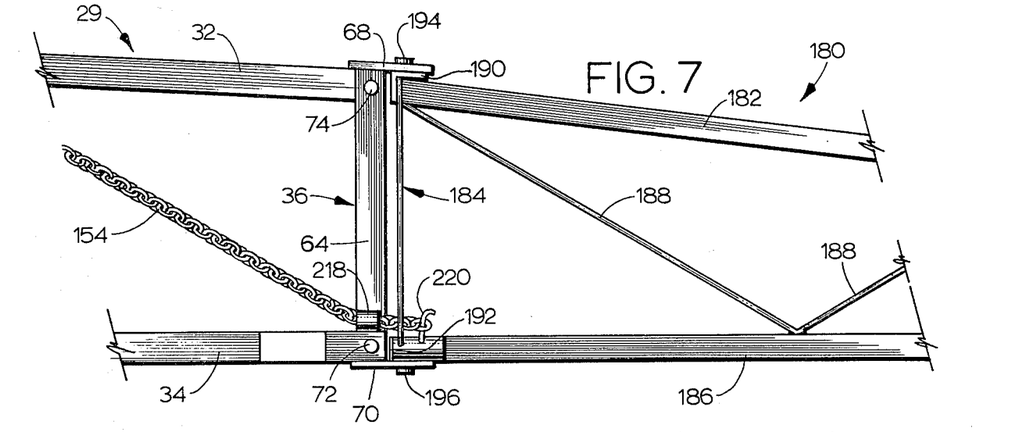
FIG. 7 is an enlarged front elevational view of a portion of one of the booms, including its outer boom section.
Figure 8:
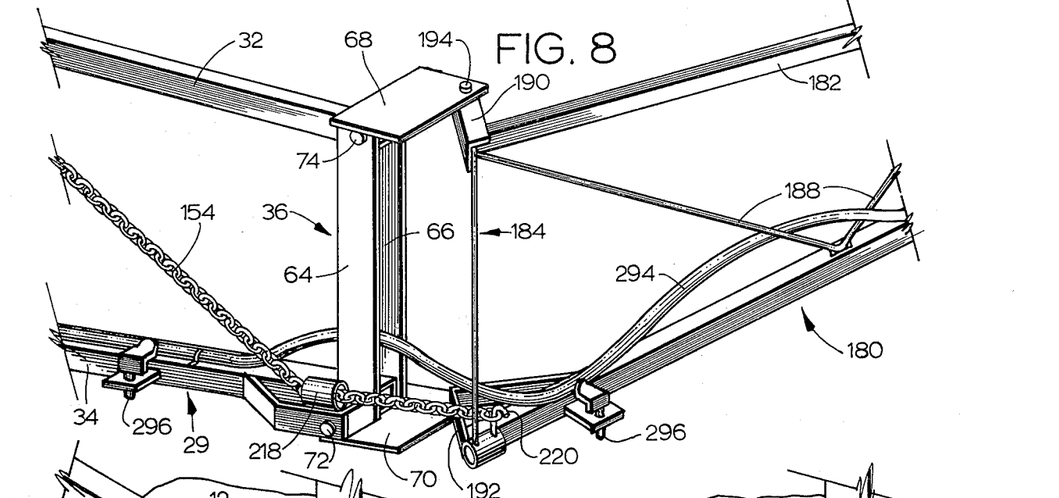
FIG. 8 is an enlarged perspective view of a portion of one of the booms illustrating the folding of the outer boom section relative to the inner section of the boom.

At their outer ends, the lower members 34 and 44 of the left and right booms 28 and 30 are pivotally mounted to their respective upright links 36 and 46. This pivotal mounting is best shown in FIGS. 7 and 8, which show enlarged frontal views (with respect to the pickup truck 12) of portions of the left boom 28. As shown, the upright link of the left boom 28 comprises a pair of generally upright parallel arms 64 and 66 secured together at their upper and lower ends by an upper plate 68 and a lower plate 70. The outer end of lower member 34 is pivotally mounted on a longitudinal axis adjacent the lower ends of parallel arms 64 and 66 by a pivot pin 72, as shown. The upright link 36 is pivotally mounted to the outer end of upper member 32 of the left boom 28 on a longitudinal axis adjacent the upper ends of parallel arms 64 and 66 by a pivot pin 74, as shown. The longitudinal axes upon which the pivot pins 72 and 74 lie, are spaced apart vertically on the upright link 36. The components of the right boom 30 are pivotally mounted together in a similar fashion. The lower member 44 is pivotally mounted at its outer end to the upright link 46 on a longitudinal axis by a pivot pin 76. The upper member 42 is pivotally mounted to the upright link 46 on a vertically spaced apart longitudinal axis by a pivot pin 78. The upright link 46 is formed in the same manner as the upright link 36, having parallel arms with upper and lower plates at the upper and lower ends of the arms.

Figure 9:
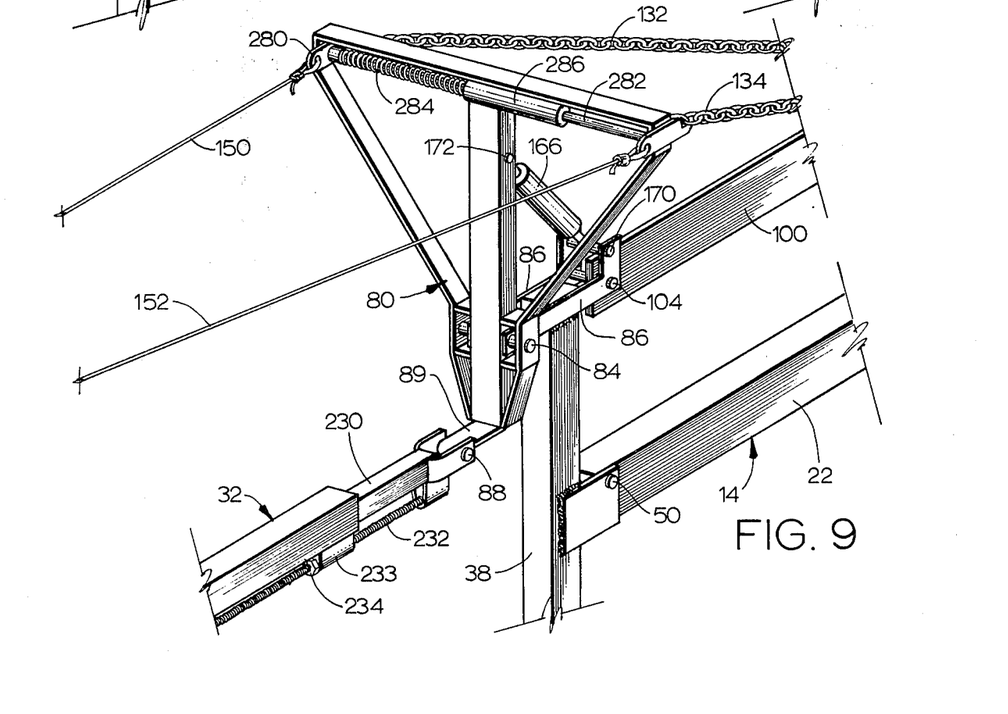
FIG. 9 is an enlarged perspective view of a suspension frame of one of the booms.

Inner ends of the upper members of the left and right booms 28 and 30 are pivotally mounted to left and right suspension frames 80 and 90, respectively, which in turn are mounted at the top ends of their respective base posts (above the base post longitudinal axis of the respective base post). As best shown in FIG. 9, the left suspension frame 80 is pivotally mounted adjacent a lower end thereof on a frame longitudinal axis by a pivot pin 84 to a pair of parallel plates 86 extending outwardly from the boom side of the left base post 38 and adjacent a top end of said base post. The inner end of the upper member 32 of the inner section of the left boom 28 is pivotally mounted on a longitudinal axis by a pivot pin 88 to a pivot plate 89 extending outwardly proximate the lower end of the left suspension frame 80. Thus, the upper member 32 is pivotally mounted through the longitudinal axes traced by pivot pins 84 and 88 to the left base post 38.

Similarly, the right suspension frame 90 is pivotally mounted adjacent a lower end thereof on a frame longitudinal axis by a pivot pin 94 to a pair of parallel plates 96 extending outwardly from the boom side of the right base post 48 and adjacent a top end of said base post. The inner end of the upper member 42 of the inner section of the right boom 30 is pivotally mounted on a longitudinal axis by a pivot pin 98 to a pivot plate extending outwardly proximate the lower end of the right suspension frame 90, in the same configuration as described relative to the left boom 28. As can be seen, the structure of the left and right booms 28 and 30 is substantially symmetrical.

Figure 10:
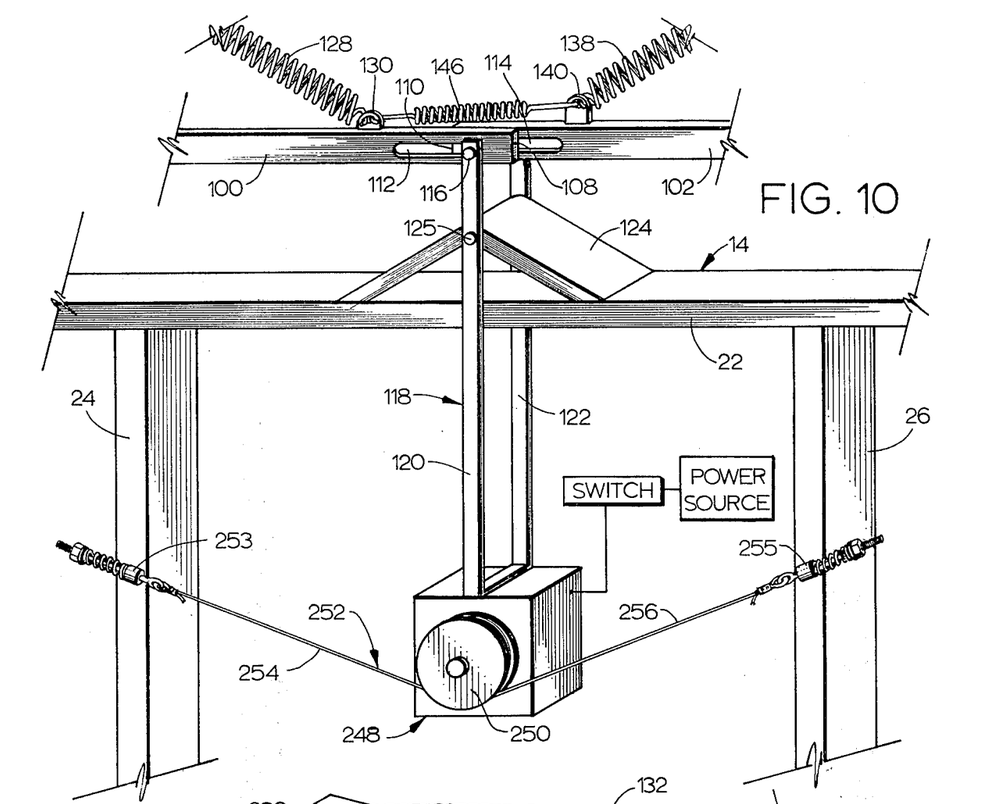
FIG. 10 is an enlarged perspective view of the central portion of the main frame and showing a lever arm assembly for raising the booms.

The parallel plates 86 and 96 also extend inwardly from the vehicle side of their respective base posts 38 and 48. The main frame 14 also includes left and right transverse slide bars 100 and 102, the outer ends of which are pivotally mounted between the respective parallel plates 86 and 96 on longitudinal axes by pivot pins 104 and 106, respectively. The left and right slide bars 100 and 102, which are substantially parallel, extend laterally above the lateral beam 22, as best seen in FIGS. 9 and 10. Respective inner ends 108 and 110 of the left and right slide bars 100 and 102 overlap adjacent a central portion of the main frame 14 as shown in FIGS. 1 and 10. Left and right transverse slide slots 112 and 114 extend through the respective slide bars 100 and 102 adjacent their inner ends 108 and 110, with the slide slots 112 and 114 overlapping along a longitudinal axis proximate the central portion of the main frame 14. A central slide pin 116 extends through the slide slots 112 and 114 along the longitudinal axis defined by their overlap.

The ends of the slide pin 116 are connected to a pivoting lever arm assembly 118 which preferably includes parallel levers 120 and 122. The slide pin 116 is mounted proximate the upper ends of the levers 120 and 122, with the lever arms being pivotally mounted on a longitudinal axis by a central pivot pin 125 to a mounting bracket 124 on the lateral beam 22. Means for pivoting the lever arm assembly 118 about the longitudinal axis traced by the pivot pin 125 are provided, as will be explained subsequently.

As shown, upper ends of the left and right suspension frames 80 and 90 are secured by bias means to their respective slide bars 100 and 102. A left bias means 126 includes a coiled spring 128, one end of which is secured to an upright ear 130 adjacent the inner end 108 of the left slide bar 100. The other end of the coiled spring 128 is secured to a nonextensible connector means, such as chains 132 and 134, which are in turn connected to the upper end of the left suspension frame 80. As best shown in FIG. 9, the left suspension frame 80 is wider at its upper end than at its lower end. The chains 132 and 134 of the left bias means 126 are secured to the left suspension frame 80 at the forward and rearward edges (relative to the pickup truck 12) of its upper end. Thus, the left bias means 126 urges the upper end of the left suspension frame 80 inwardly toward the central portion of the main frame 14.

A right bias means 136 is similarly mounted between the upper end of the right suspension frame 90 and the right slide bar 102. The right bias means 136 includes a coiled spring 138 one end of which is secured to an upright ear 140 adjacent the inner end 110 of the right slide bar 102. The other end of the coiled spring 138 is secured to a nonextensible connector means, such as chains 142 and 144, which are in turn connected to the upper end of the left suspension frame 80 at its forward and rearward edges. The right bias means 136 urges the upper end of the right suspension frame 90 inwardly toward the central portion of the main frame 14. As shown, a spring 146 preferably connects the inner ends 108 and 110 of the left and right slide bars 100 and 102. Because the slide bars 100 and 102 are mounted via the slide slots 112 and 114 at their inner ends, the slide bars are not fixed position members and thus spring 146 serves to reduce chatter and undesirable movement of the slide bars during transport and operation of the boom assembly 10.

Each boom, besides being pivotally supported from its respective side of the main frame 14, is also coupled to the main frame 14 by a nonextensible connector means extending from the upper end of its respective suspension frame to adjacent its respective upright link. A left connector means 148 consists of a pair of cables 150 and 152 secured at their inner ends adjacent the edges of the upper end of the left suspension frame 80, as shown in FIG. 9. The cables 150 and 152 are joined at their outer ends to a single connector, such as chain 154, which, in turn, is secured to the left boom 28 adjacent the upright link 36. The right boom 30 is similarly coupled to the main frame 14 by a right nonextensible connector means 158 having cables 160 and 162 extending from adjacent the edges of the upper end of the right suspension frame 90 to a chain 164, which in turn is secured to the right boom 30 adjacent the upright link 46.

The left and right suspension frames 80 and 90 are each secured to their respective base posts by motion limiting means, such as left and right conventional telescopic shock absorbers 166 and 168. As shown in FIG. 9, one end of the left shock absorber 166 is mounted on the parallel plates 86 on a longitudinal axis by a pivot pin 170. The other end of the left shock absorber 166 is mounted adjacent the upper end of the left suspension frame 80 on a longitudinal axis by a pivot pin 172. The right shock absorber 168 is pivotally mounted between the parallel plates 96 and the upper end of the right suspension frame 80 in a similar manner.

Preferably, outer boom sections are mounted at the outer ends of the left and right booms 28 and 30 to increase the operational width of the boom assembly 10. The outer boom sections are secured to the inner section of each boom generally as in FIG. 7, which is a frontal view of a portion of the left boom 28. A left outer boom section 180 is generally triangular in shape and rigid of construction, having an upper hypotenuse member 182 secured between an upright inner side member 184 and a lower base member 186. A plurality of reinforcing rods 188 are bonded between the members of the left outer boom section 180 to further strenghten its structure. An inner end of the upper member 182 and an upper end of the inner side member 184 are bonded to an upper bracket 190 which is mounted upon the upper plate 68 of the upright line 36. An inner end of the lower base member 186 and a lower end of the inner side member 184 are bonded to a lower bracket 192 (as shown in FIG. 8) which is mounted upon the lower plate 70 of the upright link 36. The outer boom section 180 is pivotally mounted to the upright link 36 of the inner section 29 along a substantially vertical axis by upper and lower pivot pins 194 and 196. Thus, the upright line 36 and outer boom section 180 are connected together to move in unison relative to vertical movement of upright member 32 and lower member 34 of the inner section 29 of the left boom 28.

Of course, a right outer boom section 200 is mounted upon the outer end of the right boom 30 in a similar manner. The right outer boom section 200 is also triangular in shape and includes an upper hypotenuse member 202, an upper inner side member 204, and a lower base member 206. The structure of the right outer boom section 200 is similarly reinforced by a plurality of reinforcing rods 208. The left outer boom section 200 has upper and lower brackets proximate the upper and lower ends of the inner side member 204 which are pivotally mounted on a substantially vertical axis by upper and lower pivot pins 214 and 216 to the upper and lower plates of the upright link 46. Thus, the right outer boom section 200 and upright link 46 are connected together to move in unison relative to vertical movement of the upper member 42 and lower member 44 of the inner section 39 of the right boom 30.

When the boom assembly 10 has outer boom sections 180 and 200, the left and right connector means 148 and 158 are connected to the outer boom sections adjacent the lower brackets thereon. As illustrated in FIGS. 7 and 8, the chain 154 of the left connector means 148 extends through a tube 218 secured upon the upright link 36 and is attached to a hook 220 adjacent the inner end of the lower base member 186 of the left outer boom section 180. The right connector means 158 is similarly secured to the right outer boom section 200, with the chain 164 of the right connector means 158 extending through a tube 222 secured on the upright link 46 and attached to a hook 224 adjacent the inner end of the lower base member 206 of the right outer boom section 200. The left and right booms 28 and 30 thus extend laterally from the sides of the pickup truck 12 to left and right boom tips 226 and 228, respectively.

For normal spraying operations, the boom assembly 10 is positioned with the lower members of each boom extending generally parallel to the ground. The height of the boom relative to the ground is adjustable, to allow for such factors as differing crop heights or liquid chemical spraying densities. To adjust the height of the each boom relative to the ground, several coordinate adjustments must be made.

On the left boom 28, a first height adjustment means is a telescoping portion 230 adjacent the inner end of the upper member 32 for adjusting the effective length of the upper member 32. The telescoping portion 230 is slidable within the upper member 32 and has a generally parallel threaded rod secured thereto and extending slidably through a housing 233 secured on the upper member 32. Telescopic extension of the upper member 32 relative to the telescoping member 230 is limited by an adjustable stop on the threaded rod 232, such as a nut 234 which abuts the housing 233 at full extension. The weight of the left boom 28 pulls the upper member 32 outwardly relative to the main frame 14 to the extent limited by the nut 234 on the threaded rod 232, as shown in FIG. 9. Adjustment of the nut 234 on the threaded rod 232 determines the effective length of the upper member 32 between its longitudinal pivots traced by pivot pins 74 and 88.

A second height adjustment means on the left boom 28 is achieved by adjusting the vertical position of the left lower boom mount 54 on the left base post 38, as previously described. A third height adjustment means is obtained by differing the length of the left connector means 148. This simply involves shortening or lengthening the length of the cables 150 and 152 or chain 154 coupling the left boom 28 and the left suspension frame 80. Therefore, to raise the height of the left boom 28 relative to the ground (and still maintain the lower members of said boom generally parallel to the ground), the left lower boom mount 54 is moved upwardly on the left base post 38, the nut 234 is moved inwardly on the threaded rod 232 to shorten the effective length of the upper member 32, and the length of the left connector means 148 is shortened. By making these changes in a coordinated fashion, the left boom 28 can be maintained relatively parallel to the ground although at a higher level. Of course, these alterations can be reversed to lower the height of the left boom 28 relative to the ground.

The height of the right boom 30 relative to the ground is adjusted in a similar fashion. The upper member 42 of the inner section 39 of the right boom 30 has a telescoping portion 240 and an adjustment means comprised of a threaded rod 242 secured on the telescoping portion 240 and extending through a fitted housing 243 on the upper member 42 and being limited by an adjustable stop, such as a nut 244. In addition, the right lower boom mount 60 is slidably adjustable up and down on the right base post 48 and the length of the right connector means 158 can be lengthened or shortened as previously explained. The heights of the booms are independently adjustable so that each boom can be used in position parallel to the ground or, if desired, in position with an angular tilt relative to the ground or the applicator vehicle.

In operation, it is often necessary for the applicator vehicle to pass in close proximity to obstructions in the path of the booms. This can occur, for example, when there are tree stumps or rocks in a field being sprayed, or when it is desirable to spray along a fence line. To this end, it is desirable to have means on the boom assembly 10 for selectively raising or tilting each of the booms relative to the main frame 14.

Figure 3:
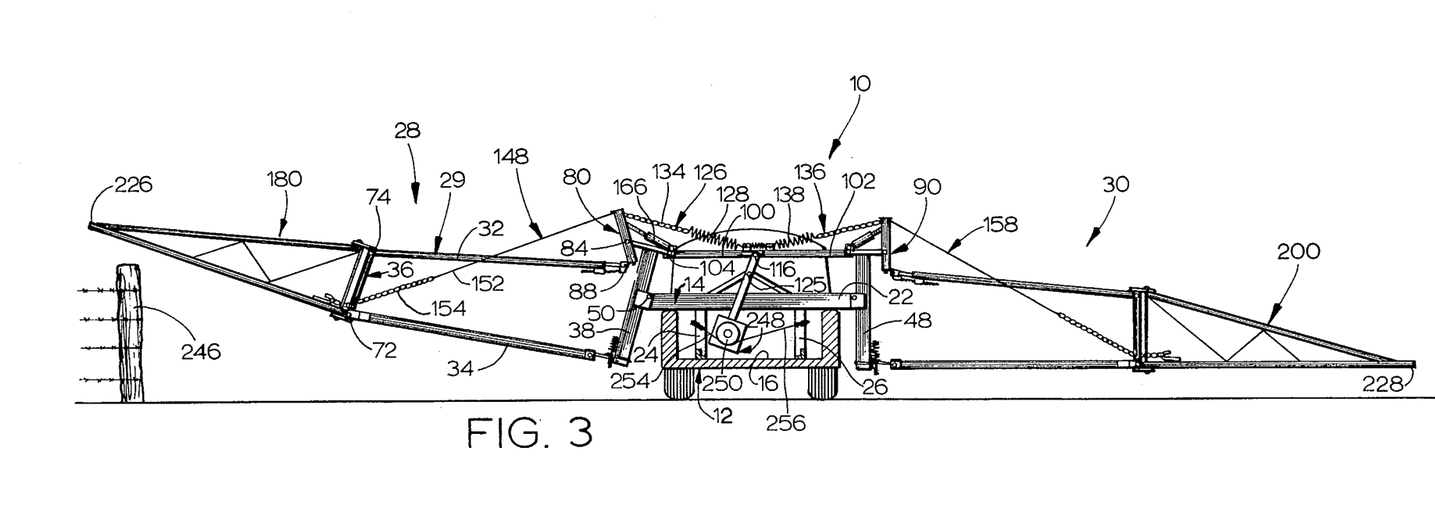
FIG. 3 is a sectional view as taken in FIG. 2 showing one boom of the boom assembly tilted relative to the main frame and vehicle.

In FIG. 3, the left boom 28 is shown in a tip-raised position so that the outer boom section 200 and its tip 226 can clear a fence post 246 in the spraying path of the boom assembly 10. The left boom 28 is moved into this position relative to the main frame 14 by initially pivoting the lever arm assembly 118 relative to the main frame 14. The lower ends of the levers 120 and 122 are connected to means for moving the lever arm assembly 118 about its longitudinal pivot traced by the pivot pin 125. Preferably, the moving means comprises an electric winch 248 with its rotational axis positioned longitudinally relative to the pickup truck 12. As shown, the winch is suspended between the levers 120 and 122 and has a pulley disk 250 fixed upon one end of its shaft. A single cable 252 is nonslippably secured upon the pulley disk 250 and has a left portion 254 and a right portion 256. The left and right ends of the cable 252 are secured upon the respective left and right support legs 24 and 26 of the main frame 14 by spring-loaded fasteners 253 and 255.

The winch 248 is a reversible winch, which is preferably controlled by a remote three-way electrical switch connected between a power source and the winch 248 and positioned for easy access by an operator of the pickup truck 12 and boom assembly 10. As viewed in FIG. 10, rotation of the pulley disk 250 by the winch 248 in a clockwise direction causes the right portion 256 of the cable 252 to wind up on the disk 250 while the left portion 254 is unwound. This results in a shortening of the length of the right portion 256 of the cable 252 and a pivoting to the left of the upper end of the lever arm assembly 118. Conversely, a rotation of the pulley disk 250 in a counterclockwise direction causes the left portion 254 of the cable 252 to wind up on the disk 250 while the right portion 256 is unwound. This results in a shortening of the length of the left portion 254 of the cable 252 and a pivoting to the right of the upper end of the lever arm assembly 118.

The pivoting movement of the upper end of the lever arm assembly 118 causes the central slide pin 116 to move also. This in turn causes a transverse sliding movement of one of the slide bars 100 and 102, depending upon the direction of movement of the slide pin 116. The left and right slide bars 100 and 102 are shown in their normally boom-lowered position in FIG. 2. In FIG. 3, however, the left slide bar 100 has been moved transversely (to the right) because of the operable connection of its inner end to the slide pin 116. The left slide bar 100 is moved in FIG. 3 from its first boom-lowered position to a second boom-raised position. The right slide boom 102, however, has not moved from its first normal boom-lowered position, since the slide pin 116 merely slid along the slide slot 114 of the slide bar 102 without engaging an end of the slide slot 114 to cause movement of the slide bar 102. As shown, the movement of the central slide pin 116 to the right (as in FIG. 3) is caused by the pivoting of the lever arm assembly 118 about the longitudinal axis traced by its pivot pin 125 which was caused by actuation of the winch 248 to shorten the length of the left portion 254 of the cable 252.

The movement of the left slide bar 100 to its second boom-raised position pivots the left base post 38 about the longitudinal axis traced by pivot pin 50 because of the pivotal connection of the outer end of the slide bar 100 with the top end of the left base post 38. Thus, the bottom end of the left base post 38 swings outwardly and upwardly relative to the main frame 14, moving the lower member 34 of the inner section 29 of the left boom 28 outwardly and upwardly also.

The movement of the left slide bar 100 to its second boom-raised position also increases the urging force exerted by the left bias means 126 between the upper end of the left suspension frame 80 and the central portion of the main frame 14, which is turn maintains the tension and force in the left connector means 148. The pivoting of the left base post 38 additionally raises the left bias means 126 and the left suspension frame 80 relative to the main frame 14 so that the left connector means 148 secured to the left boom 28 adjacent the upright link 36 cooperate to pull the boom 28 upwardly also.

As the lower member 34 moves outwardly and upwardly, the inner end of the upper member 32 moves inwardly relative to the left base post 38 to move the lower end of the left suspension frame 80 inwardly and cause the upper end of the left suspension frame 80 to pivot outwardly relative to the longitudinal axis traced by its pivot pin 84. The pivoting of the lever arm assembly 118, left base post 38 and left suspension frame 80, along with the sliding movement of left slide bar 100, create the necessary motions and forces in the structural components of the boom 28 and its bias means 126 and connector means 148 to raise or tilt the boom 28 relative to the main frame. The connector means 148 effectively pulls the boom 28 upwardly adjacent the upright link 36 while the pivoting base post 38 moves the inner section 29 of the boom 28 outwardly and upwardly.

Because of the overlapping left and right slide slots 112 and 114, one boom can be raised while the other boom remains in its normal operational position as shown generally in FIG. 3. To lower the left boom 28 from its raised position, the winch 128 is merely actuated in a reverse direction to return the lever arm assembly 118 to a generally vertical position, which correspondingly returns the left base post 38 and left suspension frame 80 to their normal, generally vertical positions (as in FIG. 2). The right boom 30 is raised or tilted relative to the main frame 14 in a similar manner as described by actuating the winch 248 to pivot the lever arm assembly 118 in an opposite direction so that the slide pin 116 moves to the left as in FIG. 3. Thus, the relative motion of one lever permits control of the raising of both left and right booms relative to the applicator vehicle.

During normal spraying operations, the vehicle carrying the boom assembly 10 will encountered ruts, holes, contoured terraces and the like, causing uneven travel of the vehicle. These ground conditions result in jarring and whipping of the booms, which if not provided for, can damage the boom assembly and vehicle and disrupt the uniform distribution of the liquid chemical. The left and right booms 28 and 30 of the boom assembly 10 of the present invention are independently coupled to the main frame 14 to move or "float" by pivot action on their respective longitudinal axes in response to contour changes encountered by the pickup truck 12. The relative movements of the booms as contour changes are encountered are shown generally in FIGS. 4 and 5.

Each boom is mounted on a plurality of longitudinal axes relative to the main frame 14. For the left boom 28, these axes include the longitudinal axes traced by the pivot pins 56, 72, 74, 84 and 88 at the pivotal connections of the various components of the boom 28. For the right boom 30, these axes include the longitudinal axes traced by the pivot pins 62, 76, 78, 94 and 98. In addition to its pivotal connections, each boom is coupled to the main frame by separate suspension means including the respective connector means, suspension frame and bias means.

Figure 4:
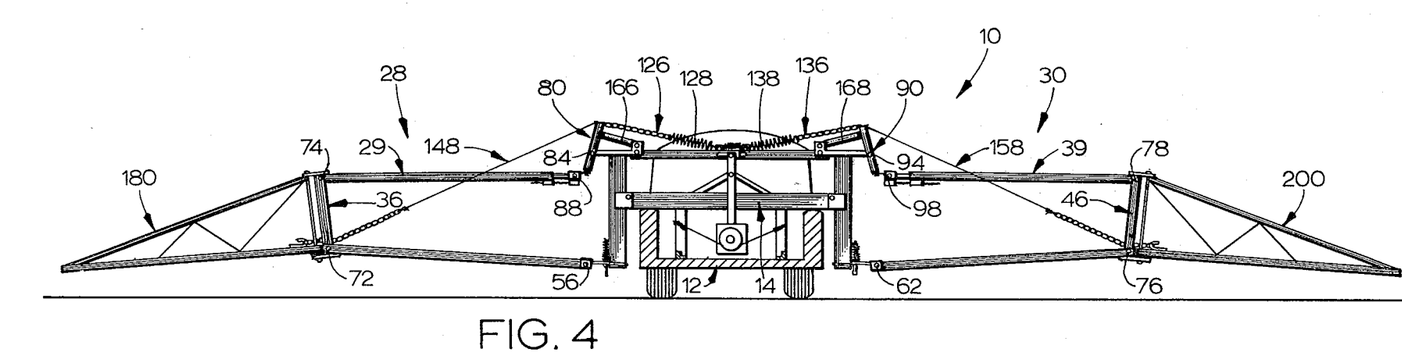
FIGS. 4 and 5 are sectional views as taken in FIG. 2 showing the relative movements of the sections of the booms as they float in returning to the normal operating position of each boom after the vehicle has encountered uneven terrain.

As shown in FIG. 4, as the pickup truck 12 encounters a hole or sudden drop-off, outer portions of the booms 28 and 30 (including the upright links 36 and 46) do not immediately react to the change, thus appearing to move to a higher position relative to the pickup truck 12 because of the truck's downward movement. The separate booms pivot about their respective longitudinal axes in an attempt to return to the normal operating position shown in FIG. 2. The booms "float" across the normal position while returning thereto because of the suspension means on each boom allows the boom to gently rock on its longitudinal axes rather than bounce up and down relative to the main frame 14.

The movements of the outer portions of the booms 28 and 30 including the upright links 36 and 46 are facilitated by the independent extensions and contractions of the coiled springs 128 and 138 on the respective bias means 126 and 136. Thus, as the main frame 14 moves downwardly, the inner section 29 of the left boom 28 pivots upwardly about the longitudinal axes traced by pivot pins 56, 84 and 88. Simultaneously, the upper end of the left suspension frame 80 pivots inwardly (because of the urging of the left bias means 126) to pull on the left connector means 148 which, in turn, lifts the inner end of the left outer boom section 180 relative to the ground, as shown in FIG. 4.

Figure 5:
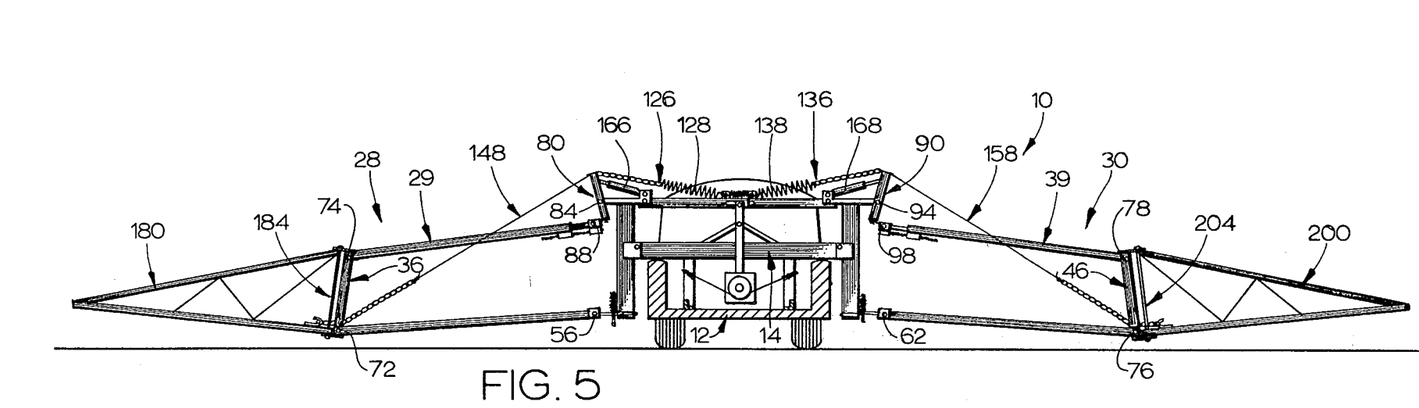

In floating back to its normal operating position, the left boom 28 also moves to position shown in FIG. 5 where inner section 29 of the left boom 28 pivots downwardly about its longitudinal axes as described relative to the main frame 14 as the main frame 14 moves upwardly. The inner end of the left outer boom section 180 is simultaneously lowered by the change in position of the left connector means 148 due to the outward pivoting of the upper end of the left suspension frame 80, as the force exerted by the weight of the left boom 28 overcomes the urging force of the bias means 126. The movement of the left boom 28 is dampened by the shock absorber 166 pivotally mounted between the left suspension frame 80 and the main frame 14. The shock absorber 166 effectively prevents over compensation by the suspension means in bringing or floating the left boom 28 back to its normal operating position.

The suspension means coupled between the main frame 14 and the right boom 30 operates in a similar manner to pivot the inner section 39 relative to the main frame and raise the right outer boom section 200 relative to the ground.

As shown in FIGS. 4 and 5, the right boom 30 also floats through its normal operating position after the pickup truck 12 has encountered a contour change. The inner section 39 of the right boom pivots about the longitudinal axes traced by pivot pins 62, 94 and 98 and the suspension means gently raises and lowers the right outer boom section in a coordinated manner as described and shown.

This independent floating action of each separate boom substantially reduces the possibility of damage to the main frame 14 and pickup truck 12 by suddenly encountered changes in the contour of the ground. As shown, the booms float or move above and below the normal operating position with their respective suspension means primarily absorbing the impact of the boom's motion relative to the main frame 14. The urging force of the bias means of each suspension means is balanced with the force exerted by the weight of its respective boom acting on the suspension means to normally maintain the boom in the operating position shown in FIG. 1. The suspension means of each boom limits or dampens the initial bouncing of each boom, as well as continuing oscillations of the boom as it returns to its normal operating position. The suspension means act to decrease impacts and shock stresses in the entire boom assembly caused by suddenly induced gravity loads on portions of the boom assembly, such as occur when the vehicle encounters uneven terrain in operation.

As best shown in FIGS. 11 and 12, each boom of the boom assembly 10 folds against a side of the pickup truck 12 for transport or storage in an nonoperational folded position. With respect to the left boom 28, the left outer boom section 180 pivots about a first substantially vertical axis traced by the pivot pins 184 and 186 pivotally connecting the left outer boom section 180 to the upright link 36 of the inner section 29. FIG. 8 shows the left outer boom section 180 partially pivoted as such with respect to the inner section 29. FIG. 11 shows the outer boom section 180 fully folded against the inner section 29 so that the two sections of the left boom 28 are positioned substantially parallel with respect to one another.

Figure 13:
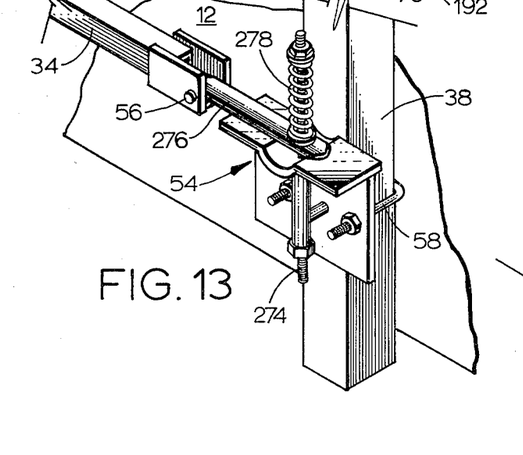
FIG. 13 is an enlarged perspective view of the lower boom mount of one of the booms and showing a portion of the boom in a folded position.

The inner ends of the upper and lower members 32 and 34 of the inner section 29 of the left boom 28 are pivotally mounted on substantially vertical axes to the lower end of the left suspension frame 80 and the left lower boom mount 54, respectively. The pivot plate 89 extending outwardly from the lower end of the left suspension frame 80 (and which is connected to the inner end of the upper member 32) is pivotally mounted on a substantially vertical axis to the left suspension frame 80 by a pivot pin 270, as shown in FIG. 2. The inner end of the lower member 34 is pivotally mounted on a substantially vertical axis by a spring-loaded pivot pin 274, as best shown in FIGS. 6 and 13. A lower pivot plate 276 extends from the inner end of the lower member 34 to the left base post 38 for pivotal mounting on the left lower boom mount 54 by a pivot pin 274. A spring 278 is secured about the pivot pin 274 to urge the plate 276 downwardly into a fitted concave portion of the left boom mount 54 to maintain the lower member 34 in lateral extension relative to the pickup truck 12, as shown in FIG. 6. To fold the inner section 29 against the pickup truck 12, the lower member 34 is pivoted about the longitudinal axis defined by the pivot pin 274 to a folded position along the side of the pickup truck 12. The spring 278 is compressed as the plate 276 rotates to span the concave portion of the lower boom mount 54, as shown in FIG. 13.

Similar pivotal mounting means are provided adjacent the inner ends of the upper and lower members 42 and 44 of the inner section 39 of the right boom 30. The pivot plate extending outwardly from the lower end of the right suspension frame 90 (and which is connected to the inner end of the upper member 42) is pivotally mounted on a substantially vertical axis to the right suspension frame 90 by a pivot pin 272, as shown in FIG. 2. The inner end of the lower member 44 is pivotally mounted on a substantially vertical axis by a spring loaded pivot pin 280 on the right lower boom mount 60. The means of mounting the inner end of the lower member 44 on the right lower boom mount 60 is identical with that previously described and shown with respect to the lower member 34. Thus, each boom is pivotally mounted on a plurality of substantially vertical axes to allow movement generally horizontally between a folded transport position and an unfolded operating position.

Because the left and right connector means 148 and 158 are inextensible, the forward cables 150 and 160 (relative to the pickup truck 12) are slidably mounted on the upper ends of their respective suspension frames 80 and 90. The cables 150 and 160 thus remain secured and taut as their respective booms 28 and 30 are folded. The slidable mounting for the left boom 28 is shown in FIG. 9. The cable 150 is secured to a sleeve 280 slidable on a longitudinal pin 282 on the upper end of the left suspension frame 80. The sleeve 280 is normally urged to the forward side of the suspension frame 80 by a coiled spring 284 which extends on the pin 282 from the sleeve 280 into a tubular housing 286. As the left boom 28 is folded, the cable 150 of the connector means 148 remains taut while the boom swings to the rear of the suspension frame 80. The cable 150 pulls the sleeve 280 rearwardly along the pin 282 compressing the spring 284 into the tubular housing 286 as the boom is folded. Upon complete folding, the sleeve 280 is positioned adjacent the longitudinal center of the left suspension frame 80, as shown in FIG. 11.

The forwardmost cable 160 of the right connector means 158 is similarly mounted upon the right suspension frame 90. As illustrated in FIG. 11, when the right boom 30 is partially folded, the slidably mounted end of the cable 160 on the right suspension frame 90 moves to position between the forward side and longitudinal center of the right suspension frame 90. The other cables (cables 152 and 162) of the left and right connector means 148 and 158 become slack during folding because of the shortening of the distance between the rearward side of their respective suspension frames 80 and 90 and the respective upright links 36 and 46. In addition to the slidable mounting just described, it is also necessary to tilt the booms upwardly during folding to maintain the fixed distance of the connector means 148 and 158 between their respective booms 28 and 30 and suspension frames 80 and 90.

To facilitate the necessary tilting of the booms during folding, the upper members 32 and 42 of each boom 28 and 30 slide inwardly along their respective telescoping portions 230 and 240. This telescoping retraction shortens the effective length of the upper members 32 and 42. The normal weight of the booms prevents inward sliding of the upper members 32 and 42 on their telescoping portions when the booms are unfolded.

By pivotally mounting the boom sections on substantially vertical axes to pivot rearwardly as shown and described, the booms independently pivot past ground obstructions, such as a tree trunk 288, as shown in phantom in FIG. 1. Because of the suspension means operably connected to the boom sections, after the right outer boom section 200 of the right boom 30 has cleared the tree trunk 288, it will spring back to its normal lateral operating position for continued spraying.

The main frame 14 has outwardly extending arms 290 and 292 for supporting the rearward portions of the booms when folded. The booms are secured to their respective arms by suitable means (not shown) to prevent accidental unfolding of the booms during movement of the pickup truck 12.

A boom constructed and positioned on a vehicle as described and shown not only provides a foldable floating boom which can be selectively raised relative to the vehicle, but also provides an agricultural spraying boom assembly more efficient than the prior art devices. Because the booms 28 and 30 extend laterally during operation from a position between the forward and rear wheels 13 of the pickup truck 12, any changes in the contour of the ground over which the pickup truck 12 travels are relatively averaged in relation to the boom assembly 10, unlike many of the prior art devices which are mounted either at the forward end or rearward end of the applicator vehicle.

An additional advantage of positioning the rearwardly folding boom assembly 10 immediately behind the operator cab 15 of the pickup truck 12 is that the booms 28 and 30, when either folded or unfolded, do not interfere with the normal access of the operator to the pickup truck 12. The doors to the operator cab 15 are not obstructed, nor is vision to the sides or front of the pickup truck 12 impaired. The lengths of the boom sections can thus be made longer than prior art booms which folded against the applicator vehicle rearwardly from the forward end of the vehicle (or forwardly from the rearward end of the vehicle) and which interfered with the operator's field of vision and access to the vehicle controls. By way of example, a boom assembly of the present invention of approximately sixty feet in total length is possible by having a main frame of a transverse width of eight feet with inner and outer boom sections of thirteen feet in length mounted on each side of the eight foot main frame. As shown generally in FIG. 12, the folded booms of the present invention merely extend rearwardly from the applicator vehicle and any additional length does not affect the normal operation of the vehicle.

Preferably, the main frame 14 has means, such as support braces 293, for supporting a conventional liquid chemical distribution system (not shown), which may include a liquid chemical tank and chemical pump. In the usual case, a liquid chemical distribution system is carried on the applicator vehicle, with the pump directing the liquid chemical from the tank through a series of conduits to a plurality of spray nozzles positioned on the booms of the spray boom apparatus. As shown in FIG. 8, a liquid chemical conduit 294 can be carried on the booms of the present invention to distribute liquid chemical to a plurality of spray nozzles 296 spaced apart along the length of the boom. In addition, the main frame 14 has a rear portion 298 secured to the bottom supports 18 and 20 and positioned transversely across the rearward end of the pickup truck 12. Spray nozzles 296 can be spaced along the rear portion 298 so that the area passed over by the pickup truck 12 is also treated with liquid chemical.

Although the present invention has been described with reference to preferred embodiments, workers skilled in the art will recognize that changes may be made in form and detail without departing from the spirit and scope of the invention.

What is claimed is:

1. A boom assembly mountable on a vehicle which comprises:
   a main frame;
   means to mount the main frame on a vehicle;
   a separate boom extending laterally from each side of the main frame, each boom including a generally upright base post and a generally upright link and having laterally extending upper and lower members pivotally connected on separate vertically spaced longitudinal axes to the generally upright link at their outer ends and pivotally connected on separate vertically spaced longitudinal axes with respect to the generally upright base at their inner ends, and the base post being pivotally mounted with respect to the main frame on a generally longitudinal base post pivot axis intermediate of the longitudinal axes adjacent the inner ends of the upper and lower members;
   means coupled to the main frame for suspending each boom in operative position extending laterally from the main frame and permitting the upper and lower members of each boom to pivot relative to the main frame; and
   means between the main frame and each boom for independently raising each boom relative to the main frame by pivoting the base post of the respective boom about its base post pivot axis and pivoting the associated boom about at least one of the longitudinal axes adjacent the inner ends of the upper and lower members of the boom.

2. The boom assembly of claim 1 wherein the raising means includes a lever arm, and wherein movement of the lever arm selectively actuates the raising means through the suspending means to pivot one of the booms.

3. The boom assembly of claim 2 wherein the lever arm is operably connected to each base post to selectively pivot the bottom end of said base post outwardly about the base post pivot axis.

4. The boom assembly of claim 3, wherein the suspending means further comprises:
   a separate suspension frame for each boom, each suspension frame being pivotally mounted proximate its lower end on a frame longitudinal axis adjacent the top end of each base post, and the inner end of the upper member of one of the booms being pivotally connected to the respective suspension frame adjacent the lower end of the respective suspension frame;
   separate connector means coupled to each boom adjacent the upright link of the respective boom and to adjacent the upper end portion of the respective suspension frame; and
   bias means between each suspension frame and the main frame to urge the upper end of each suspension frame inwardly toward the main frame.

5. The boom assembly of claim 4, further comprising:
   a separate outer boom section connected to and supported on the upright link of each boom.

6. The boom assembly of claim 5 and means to pivotally mount each outer boom section to the respective upright link along a first substantially vertical axis, and means to pivotally mount each boom to the main frame along at least one second substantially vertical axis.

7. The boom assembly of claim 1 wherein each boom has means for independently adjusting the height of the boom relative to the ground.

8. A boom assembly mountable on a vehicle which comprises:
a main frame;
means to mount the main frame on a vehicle;
a separate foldable boom extending laterally from each side of the main frame in a first unfolded position, each boom having an inner section and an outer section, the inner section being pivotally connected to the main frame along a first substantially vertical axis and the outer section being pivotally connected to the inner section along at least one substantially vertical axis, each inner section including a generally upright base post and a generally upright link and having laterally extending upper and lower members pivotally connected on separate longitudinal axes to the generally upright link at their outer ends and means to pivotally connect the inner ends of the upper and lower members on separate longitudinal axes to the generally upright base post, and the base post being pivotally mounted with respect to the main frame on a generally longitudinal base post pivot axis intermediate of the longitudinal axes adjacent the inner ends of the upper and lower members;
means for suspending the sections of each unfolded boom to pivot about the longitudinal axes of the inner section of said boom relative to the main frame; and
means between the main frame and each boom for independently raising one of the unfolded booms relative to the main frame by pivoting the base post of the respective boom about its base post pivot axis and pivoting the respective boom about at least one of the longitudinal axes adjacent the inner ends of the upper and lower members of the inner section of the boom.

9. The boom assembly of claim 8 wherein the main frame has a left and right side, the foldable booms are left and right booms extending from the left and right sides of the main frame respectively, the base posts are left and right base posts, each base post is mounted proximate its midpoint on a longitudinal axis on its respective side of the main frame so that each base post has a boom side and an opposite vehicle side, and the lower member of the inner section of each boom is pivotally mounted on a longitudinal axis at the bottom end of its respective base post on the boom side of said base post, and the raising means comprises:
left and right generally parallel slide bars extending transversely across the main frame, each slide bar having an inner end and an outer end, and the outer end of each slide bar being pivotally mounted on its respective base post on a longitudinal axis adjacent a top end of said base post on the vehicle side of said base post;
left and right suspension frames, each suspension frame being pivotally mounted proximate its lower end on a longitudinal axis adjacent the top end of its respective base post on the boom side of said base post, and the upper member of the inner section of each boom being pivotally mounted on a longitudinal axis proximate the lower end of its respective suspension frame;
connector means extending from adjacent an upper end of each suspension frame to the outer section of its respective boom;
bias means between each suspension frame and its respective slide bar to urge the upper end of said suspension frame toward the inner end of said slide bar; and
means for sliding each slide bar in a direction away from its respective base post from a first boom lowered position to a second boom raised position, each sliding slide bar pulling on the top end of the vehicle side of its respective base post causing said base post to pivot relative to the main frame so that the bottom end of said base post pivots outwardly to move the lower member of the inner section of its respective boom outward and upward relative to the main frame, the movement of said boom causing the upper member of said inner section to move inwardly toward the main frame against the lower end of said suspension frame causing the top end of said suspension frame to pivot outwardly relative to said base post against the bias means to place tension on the connector means which in cooperation with the movement of the members of the inner section of said boom causes said boom to tilt upwardly relative to the main frame and vehicle.

10. The boom assembly of claim 9 wherein the sliding means comprises:
a transversely extending slide slot proximate the inner end of each slide bar, the slide slots of the slide bars being aligned at the lateral center of the main frame to overlap along a longitudinal axis;
a slide pin extending along the longitudinal axis defined by the overlap of the slide slots; and
means for moving the slide pin so that said movement causes one slide bar to slide transversely relative to the main frame toward its second boom raised position while the other slide bar remains generally stationary in its first boom lowered position.

11. The boom assembly of claim 10 wherein the moving means comprises:
a lever arm pivotally mounted proximate its midpoint on a longitudinal axis on the main frame, and the slide pin being pivotally mounted on the lever arm adjacent a top end of the lever arm; and
means for pivoting the bottom end of the lever arm relative to the main frame in a first direction to move the slide pin in a second generally opposite direction.

12. The boom assembly of claim 8 wherein the main frame has a left and right side, the foldable booms are left and right booms extending from the left and right sides of the main frame respectively, the outer section of each boom being mounted on the upright link member of the inner section of said boom, and the suspension means comprises:
left and right suspension frames, each suspension frame being pivotally mounted proximate its lower end on a longitudinal axis on its respective side of the main frame, the upper member of the inner section of each boom being pivotally mounted on a longitudinal axis adjacent a lower end of its respective suspension frame, and the lower member of the inner section of said boom being pivotally mounted on a longitudinal axis to the main frame below said suspension frame;
left and right connector means, each connector means connecting lower portions of the upright link and outer section of the respective boom with the upper end of the respective suspension frame; and left and right bias means, each bias means connecting the upper end of its respective suspension frame to a central portion of the main frame to urge the upper end of said suspension frame toward the central portion of the main frame.

13. The boom assembly of claim 12, further comprising:
  left and right shock absorber means pivotally mounted between the main frame and the respective suspension frames.

14. A spray boom mountable on a vehicle which comprises:
  a main frame;
  means to mount the main frame on a vehicle;
  a boom extending laterally from at least one side of the main frame, the boom including a generally upright base post and a generally upright link and having laterally extending upper and lower members pivotally connected on separate longitudinal axes to the generally upright link at their outer ends and means to pivotally connect the inner ends of the upper and lower members on separate longitudinal axes with respect to the base post;
  means to pivotally mount the base post to the main frame on a longitudinal base post axis positioned between the upper and lower members of the boom, the base post having a top end and a bottom end;
  a lever arm pivotally mounted on the main frame and connected to the base post to control pivotal movement of the base post about the base post axis;
  the means to pivotally mount the upper member to the base post including a suspension frame pivotally mounted proximate its lower end on a frame longitudinal axis adjacent the top end of the base post, and the inner end of the upper member of the boom being pivotally connected to the suspension frame adjacent the lower end of the suspension frame;
  connector means coupled to the boom adjacent the upright link of the boom and adjacent an upper end of the suspension frame; and
  bias means between each suspension frame and the main frame to urge the upper end of the suspension frame toward the main frame and to create a force through the suspension means tending to lift the upright link.

15. The spray boom of claim 14 wherein movement of the lever arm selectively pivots the bottom end of said base post outwardly about the base post pivot axis.

16. The spray boom of claim 14, and further comprising:
  a separate outer boom section connected to and supported on the upright link of the boom.

17. The spray boom of claim 16, and further comprising:
  means to pivotally mount the outer boom section to the upright link along a first substantially vertical axis; and
  means to pivotally mount the boom to the main frame along at least one second substantially vertical axis.

18. The boom of claim 14 wherein the boom has means for adjusting the height of the boom relative to the ground.

19. The spray boom of claim 14 wherein the main frame has a left and right side, left and right booms extend from the left and right sides of the main frame respectively, the base posts are left and right base posts, each base post is mounted proximate its midpoint on its base post pivot axis on its respective side of the main frame so that said base post has a boom side and an opposite vehicle side, the inner end of the lower member of the inner section of each boom is pivotally mounted on a longitudinal axis adjacent the bottom end of its respective base post on the boom side of said base post, left and right suspension frames are mounted on the boom sides of the left and right base posts respectively, the inner end of the upper member of the inner section of each boom is pivotally mounted on a longitudinal axes proximate the lower end of its respective suspension frame, and the lever arm is pivotally mounted on the main frame on a longitudinal axis proximate its midpoint, and further comprising:
  left and right generally parallel slide bars extending transversely across the main frame, each slide bar having an inner end and an outer end, the outer end of each slide bar being pivotally mounted on its respective base post on a longitudinal axis adjacent the top end of said base post on the vehicle side of said base post, each slide bar having a transversely extending slide slot proximate its inner end, and the slide slots of the slide bars being aligned adjacent the lateral center of the main frame to overlap along a longitudinal axis;
  a slide pin extending along the longitudinal axis defined by the overlap of the slide slots; and
  the slide pin being mounted on the lever arm adjacent a top end thereof so that pivotal movement of a bottom end of the lever arm in a first direction moves the slide pin in a generally opposite second direction causing one of the slide bars to move away from its respective base post from a first boom lowered position toward a second boom raised position so that the moving slide bar pulls on the top end of the vehicle side of its respective base post causing said base post to pivot relative to the main frame so that the bottom end of said base post pivots outwardly to move the lower member of the inner section of its respective boom outwardly and upwardly relative to the main frame, the movement of said boom causing the upper member of said inner section to move inwardly toward the main frame against the lower end of said suspension frame causing the top end of said suspension frame to pivot outwardly relative to said base post against the bias means to place tension on the connector means which in cooperation with the movement of the members of the inner section of said boom causes said boom to tilt upwardly relative to the main frame and vehicle.

20. The spray boom of claim 19 wherein the slide slots and slide pin are aligned so that movement of the slide pin causes one slide bar to move transversely relative to the main frame toward its second boom raised position while the other slide bar remains generally stationary in its first boom lowered position.

21. The spray boom of claim 19, and further comprising:
  means for pivoting the bottom end of the lever arm relative to the main frame in a first direction to move the slide pin in a second generally opposite direction.

22. The boom assembly of claim 14, and further comprising:
  a slide bar extending transversely across the main frame and having an inner end and an outer end, the outer end of the slide bar being pivotally mounted with respect to the base post on a longitudinal axis adjacent the top end of the base post and the inner end of the slide bar being pivotally mounted with respect to one end of the lever arm so that movement of that end of the lever arm in direction away from the base post causes the slide bar to move away from the base post from a first boom lowered position toward a second boom raised position which pivots the bottom end of the base post outwardly away from the main frame about the base post pivot axis.

23. The spray boom of claim 22 wherein there is a boom extending from each side of the main frame, each boom has a separate slide bar, and further comprising:
   means for operably coupling an end of the lever arm to the two slide bars so that selected movement of said end of the lever arm in a first direction causes a first one of the slide bars to move generally in the first direction while a second one of the slide bars remains stationary and selected movement of said end of the lever arm in a second, generally opposite direction causes the second one of the slide bars to move generally in the second direction while the first one of the slide bars remains stationary.

24. The spray boom of claim 23 wherein each slide bar has a transversely extending slide slot proximate its inner end and the slide slots of the two slide bars are aligned proximate the lateral center of the main frame to overlap along a longitudinal axis, and wherein the means for operably coupling comprises:
   a slide pin mounted adjacent a first end of the lever arm, which is received in the slide slots and extends along the longitudinal axis defined by the overlap of the slide slots.

25. The spray boom of claim 22, and further comprising:
   means for moving the lever arm with respect to the base post.

* * * * *